F. V. ELBERTZ.
DIFFERENTIAL MECHANISM.
APPLICATION FILED AUG. 2, 1916.
1,282,782.
Patented Oct. 29, 1918.
3 SHEETS—SHEET 1
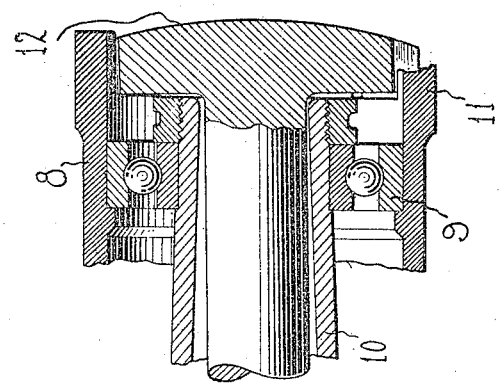
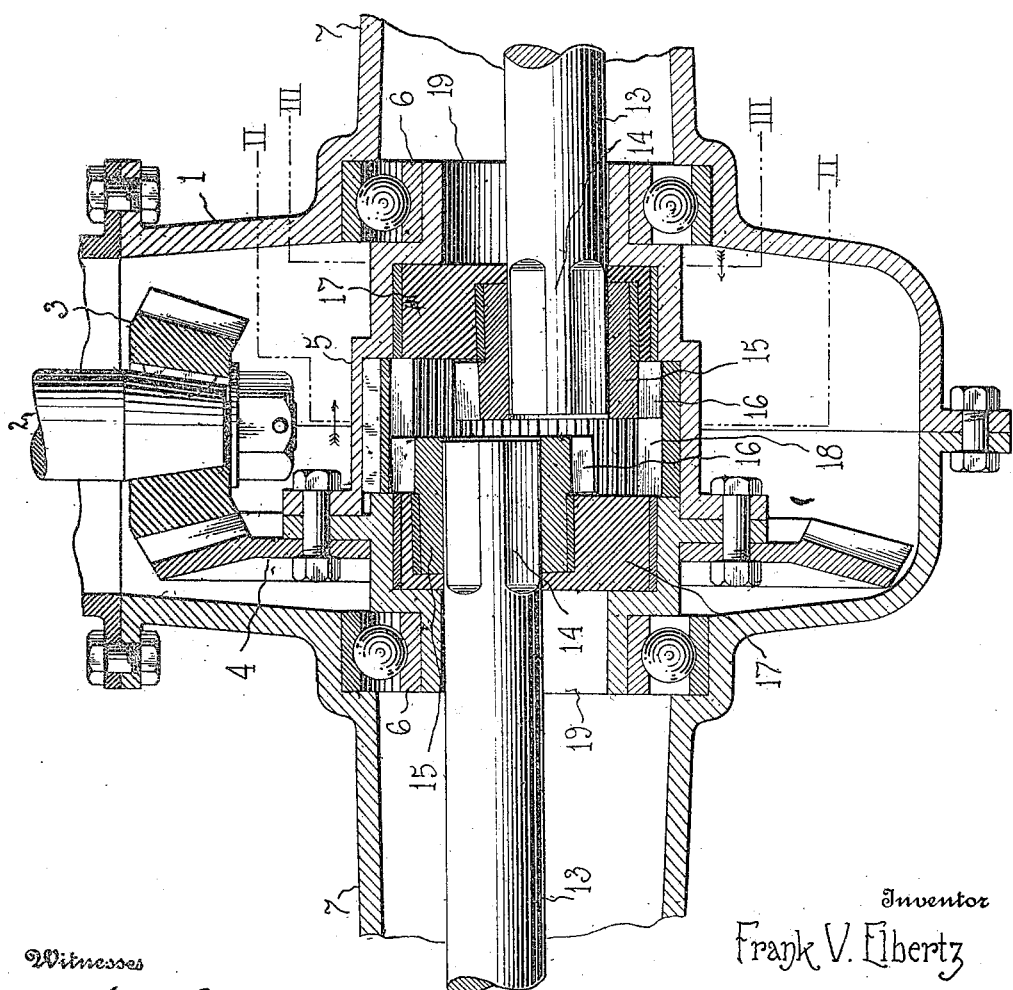
Witnesses
Arthur F. Draper
Chas. W. Stauffer
Inventor
Frank V. Elbertz
By
Barthel & Barthel
Attorneys

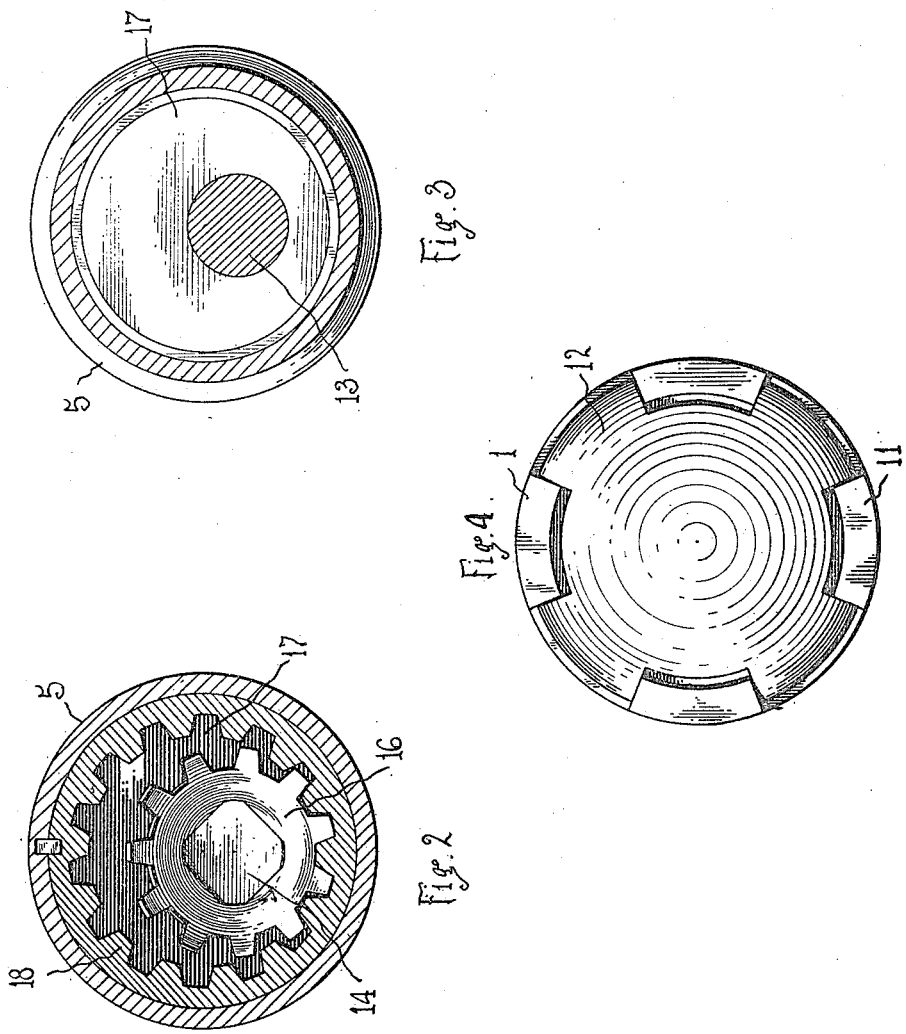

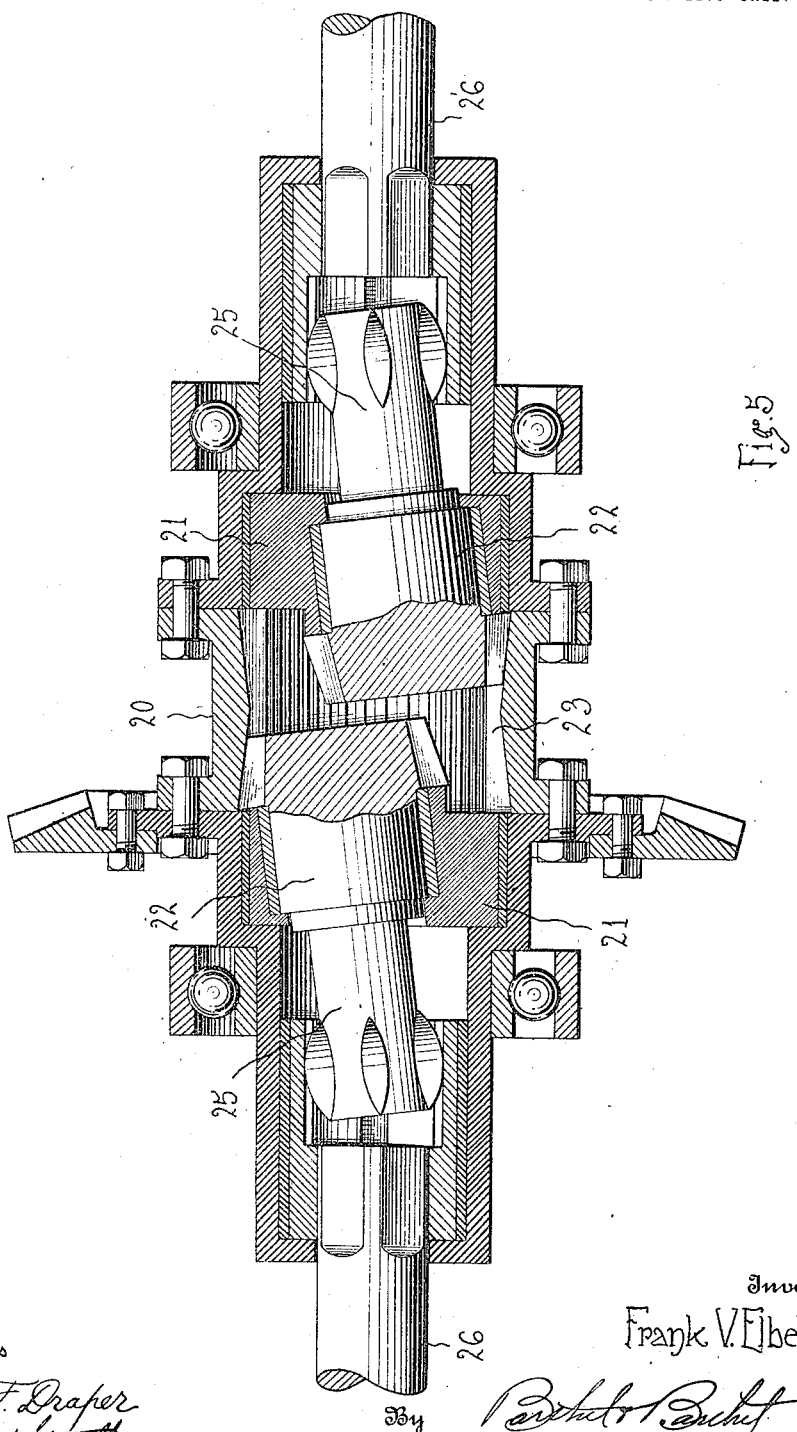

UNITED STATES PATENT OFFICE.

FRANK V. ELBERTZ, OF DETROIT, MICHIGAN.

DIFFERENTIAL MECHANISM.

1,282,782.        Specification of Letters Patent.        Patented Oct. 29, 1918.

Application filed August 2, 1916. Serial No. 112,696.

*To all whom it may concern:*

Be it known that I, FRANK V. ELBERTZ, a citizen of the United States of America, residing at Detroit, in the county of Wayne and State of Michigan, have invented certain new and useful Improvements in Differential Mechanism, of which the following is a specification, reference being had therein to the accompanying drawings.

This invention relates to differential gearing and to an arrangement thereof whereby a pair of shafts are driven in such manner as to compensate for different requirements of service by means which prevent either of them from turning at lower speed than the driving elements. The invention also includes means whereby the result is obtained without the use of the spiders, planetary pinions or beveled gears common in devices of this type.

The invention consists in the matters hereinafter set forth, and more particularly pointed out in the appended claims.

In the drawings,

Figure 1 is a view partially in longitudinal section and partially in elevation, and broken away, of a device embodying features of the invention;

Fig. 2 is a view in transverse section taken on or about line II—II of Fig. 1;

Fig. 3 is a view in section taken on or about line III—III of Fig. 1;

Fig. 4 is a view in end elevation of the outer lateral portion shown in Fig. 1, illustrating in detail one method of delivering power from the section of the differential shaft of the device, and Fig. 5 is a view in longitudinal section partially broken away and in elevation, of a modification of the device.

As herein shown the device is illustrated in connection with the rear axle or traction axle drive mechanism of an automobile, although its use is not limited to such purposes. In the drawing, an appropriately formed and designed casing 1 houses, in part at least, a drive shaft 2 the beveled gear 3 of which meshes with an annular follower pinion 4 secured on a rotatable gear casing 5 which is appropriately journaled as by anti-friction bearings 6 in the outer stationary portions of arms 7 of the casing 1. Concentrically with the annular extensions 7 of the casing 1 are a pair of oppositely disposed naves 8 of wheels, appropriate bearings 9 being provided for the same on the extremities 10 of the arms. The flange portion 11 of each hub interlocks with a head 12 of a companion section 13 of the differential shaft, the inner squared, splined or keyed portion 14 of which non-rotatably engages in the hub 15 of a follower pinion 16. The latter is journaled eccentrically in a bushing 17 that is in turn rotatable concentrically in the casing 5. An annular gear 18 of the internal type formed on or secured in the casing 5, is in mesh with the pinions 16. The end openings 19 of the casing 5 are such as to permit free revolution of the members 13 around their respective axes of rotation.

It is to be understood that the pinions 16 are sufficiently beveled or otherwise arranged to mesh with the gears 18, the whole being appropriately secured in place either by the abutment of the two gears or by other suitable provision.

As a result of this construction any motion carried to the beveled pinion 4 by the drive gear 3, is communicated through the internal annular gear equally to the shaft sections 13, so that the latter drive the hubs of the wheels at their outer ends at equal rates. If for any reason, as for example in turning around a corner, it is necessary that the outer wheel travel faster than the other, then the pinion 16 keyed or made fast to the particular section 13 of the differential moves a head on the annular gear 18 a sufficient number of teeth to make up the increase in motion required. Of course retrograde motion is impossible because of the arrangement of the parts.

If it is desired to shorten the length of the section 13 and give the outer portions rigid support so that they turn concentrically on their axes without the angular disposition necessary in the construction shown in Figs. 1 to 4, the arrangement shown in Fig. 5 may be used. In this instance the casing 5 in the usual construction is replaced by the casing 20 in which a pair of eccentrically apertured bushings 21 affords support for angularly disposed or obliquely arranged beveled pinions 22, the inner end portions of which mesh with the corresponding beveled gears 23 of the casing 20, while the eccentric shaft 25 of each gear 22 is arranged to non-rotatably and oscillatorily engage with the follower shaft sections 26, which are appropriately journaled in the extended portions of the casing.

As a result of this construction, a differential mechanism is obtained which obviates the use of planetary pinions and of beveled gears of the acute or normal miter type, eliminates a large number of parts and produces the result of the inner or slower moving shaft always being positively driven, this result being obtained because the slower moving shaft cannot rotate at less than the rate of speed of the driving member. Furthermore the elimination of the parts common in conventional differentials minimizes the friction and increases the efficiency of the device.

Obviously, changes in the details of construction may be made without departing from the spirit of my invention and I do not care to limit myself to any particular form or arrangement of parts.

What I claim is:—

1. Differential gearing comprising a casing, a drive shaft concentric thereto, a driven shaft having oppositely disposed sections oscillatory in the casing transversely to the drive shaft and journaled in the casing at a point remote from the drive shaft, a gear casing journaled in the main casing, gearing rotating the latter casing from the drive shaft, bushings rotatable in the gear casing, an annular gear in the gear casing and pinions each secured to the end portions of a differential drive shaft section journaled in the bushings eccentrically with the axis of rotation thereof, and meshing respectively with the annular gear.

2. Differential gearing comprising a drive shaft, a driven shaft having two sections transversely disposed to the drive shaft, a rotatable gear casing, means connecting the drive shaft and gear casing to rotate the latter, an internal annular gear in the gear casing, bushings concentrically journaled in the gear casing, pinions journaled in the bushings eccentrically with the axis of rotation thereof in mesh with the annular gear and secured non-rotatably to the adjacent portion of the differential drive shaft sections, and means for rotatably supporting the portions of the drive shaft sections at points remote from the connection of the eccentrically moving pinions.

3. Differential gearing comprising an outer casing, a gear casing journaled therein, a differential follower shaft having journaled in the outer casing, bushings journaled concentrically in the gear casing, an annular internal gear in the gear casing concentric with the axis of revolution of the bushings, pinions each journaled in a bushing eccentrically with the axis of rotation thereof, in mesh with the internal annular gear and secured non-rotatably to the adjacent portions of the differential shaft sections and gearing for rotating the gear casing from a source of power.

4. Differential gearing comprising an outer casing, a drive shaft, a differential shaft disposed transversely to the drive shaft and formed of two separated sections the outer portions of which are rotatably supported in the outer casing, a gear casing journaled in the outer casing, gearing transmitting motion from the drive shaft to the gear casing, an internal annular gear secured in the casing, bushings rotatably journaled in the casing in axial alinement with the internal annular gear, and pinions journaled in the bushings eccentrically with the axes thereof and non-rotatably secured to the companion portions of the differential drive shaft sections.

5. Differential gearing for automobiles including an outer axle casing having tubular extremities, wheels journaled on the tubular extremities thereof, a drive shaft extending into the casing transversely to the axis of the wheels, a gear casing journaled in the axle casing, gearing driving the gear casing from the drive shaft, an internal annular gear secured in the casing, bushings rotatably secured in the casing concentric with the wheel axis, and pinions journaled in the bushings in mesh with the annular gear and eccentric to the wheel axis and follower shaft sections secured at their outer extremities to the wheels respectively, and non-rotatably secured at the inner end portions to the eccentric pinions.

In testimony whereof I affix my signature in presence of two witnesses.

FRANK V. ELBERTZ.

Witnesses:
ANNA M. DORR,
CHAS. W. STAUFFIGER.